United States Patent
Prenninger et al.

(10) Patent No.: US 6,363,721 B1
(45) Date of Patent: Apr. 2, 2002

(54) INTERNAL COMBUSTION ENGINE, IN PARTICULAR OF THE SELF-IGNITING TYPE

(75) Inventors: Peter Prenninger; Reinhard Knoll; Michael Frings, all of Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/599,505

(22) Filed: Jun. 23, 2000

(30) Foreign Application Priority Data

Jun. 24, 1999 (AT) .......................................... 445/99 U

(51) Int. Cl.$^7$ ................................................ F02B 33/44
(52) U.S. Cl. ........................ 60/611; 60/599; 123/563; 123/545
(58) Field of Search ..................... 60/611, 607, 599; 123/563, 376, 545

(56) References Cited

U.S. PATENT DOCUMENTS

| | | | | |
|---|---|---|---|---|
| 4,503,833 A | * | 3/1985 | Yunick ....................... | 123/545 |
| 4,802,452 A | * | 2/1989 | Kanesaka ................... | 123/376 |
| 4,817,387 A | * | 4/1989 | Lashbrook .................. | 60/611 |
| 5,064,423 A | * | 11/1991 | Lorenz et al. ............... | 60/611 |
| 5,477,839 A | * | 12/1995 | Oshima et al. .............. | 123/563 |
| 5,553,580 A | * | 9/1996 | Ganoung .................... | 123/308 |
| 5,704,323 A | | 1/1998 | Gardell et al. ............... | 60/607 |
| 6,167,703 B1 | * | 1/2001 | Rumez et al. ................ | 60/599 |

FOREIGN PATENT DOCUMENTS

| | | |
|---|---|---|
| DE | 1451898 | 7/1969 |
| DE | 3721522 | 2/1988 |
| FR | 2283315 | 3/1976 |
| GB | 828235 | 2/1960 |
| GB | 2163483 | 2/1986 |

* cited by examiner

Primary Examiner—Thomas Denion
Assistant Examiner—Thai-Ba Trieu
(74) Attorney, Agent, or Firm—Dykema Gossett PLLC

(57) ABSTRACT

This invention relates to an internal combustion engine, in particular of the self-igniting type, with a compressor, which is preferably connected to an exhaust gas turbine and is located in an intake flow passage for compression of the intake air, and with a charge air line leading to an intake manifold, the compressor operating independently of the engine, at least in the starting phase. To permit a quick and simple start-up of the engine at a low compression ratio the proposal is put forward that an air recirculation line controlled by a valve depart from the intake manifold, which opens into the intake flow passage upstream of the compressor, charge air line and air recirculation line forming a closed loop.

7 Claims, 2 Drawing Sheets

INTERNAL COMBUSTION ENGINE, IN PARTICULAR OF THE SELF-IGNITING TYPE

BACKGROUND OF THE INVENTION

This invention relates to an internal combustion engine, in particular of the self-igniting type, with a compressor, which is preferably connected to an exhaust gas turbine and is located in an intake flow passage for compression of the intake air, and with a charge air line leading to an intake manifold, the compressor operating independently of the engine, at least in the starting phase.

DESCRIPTION OF THE PRIOR ART

By reducing the compression ratio the weight of the engine may be reduced, especially with diesel engines, since a lightweight crankshaft and smaller crankshaft bearings may be used. With internal combustion engines having a low compression ratio in the cylinder the low final compression temperature resulting therefrom will not suffice during a starting operation at low external temperatures to reach the temperature required for self-ignition of the diesel-air mixture. By preheating the combustion air before and during starting this disadvantage may be compensated.

For the purpose of preheating the combustion air several measures to assist starting may be employed. On the one hand the required fuel ignition temperature may be produced locally in the combustion chamber with the use of a heat source, such as a glow plug, or the intake air may be preheated, for example by means of a flame starter, or electrical energy may be introduced into a heater flange. Furthermore, volatile ignition accelerators or improvers may be introduced in liquid or gaseous form, which, apart from the necessary additional metering devices, has the disadvantage of necessitating yet another medium.

The main argument against a heater flange is that at temperatures below zero degrees centigrade the heating process may well take longer than sixty seconds. This is not only time-consuming but will also cost considerable energy, as it requires the heating of both the air and the heat exchange faces, which consist of metal and have a much higher heat capacity than air. The heat exchange faces must have a close mesh to ensure good heat transfer from heater flange to air, which will however impede the air flow during operation of the engine. Glow plugs require additional space in the cylinder head, which is not always available.

An alternative for supercharged diesel engines would be to operate the compressor for the charge air by means of an additional drive during starting and to preheat the cylinders by compression of the intake air. U.S. Pat. No. 5,704,323 describes an internal combustion engine comprising a turbocharger which is electrically driven during start-up in order to increase the temperature of the intake air. The air taken in at ambient temperature is compressed and forced into the cylinders directly via the intake valves. At a low compression ratio and low ambient temperatures a relatively long time will be required for preheating the combustion air with this method.

In DE 37 21 522 A1 and GB 2 163 483 A a technique is described where the output side of the compressor is connected to a valve-controlled air recirculation line in order to control the boost pressure of the compressor. DE 14 51 898 A describes an internal combustion engine with an exhaust gas turbine, where downstream of the compressor an automatic controller is located in the charge air line, which connects the output side of the compressor to atmospheric pressure during starting, in order to reduce the start-up phase of the charge blower. With these known devices the compressor cannot be operated independently of the internal combustion engine during starting, and the time required for heating up the combustion air at low ambient temperatures will not be significantly reduced.

SUMMARY OF THE INVENTION

It is an object of the invention to avoid these disadvantages and to improve the starting properties of internal combustion engines, particularly of self-igniting engines with low compression ratio.

According to the invention this object is achieved by providing that a valve-controlled air recirculation line branch off from the intake manifold, which opens into the intake flow passage upstream of the compressor, charge air line and air recirculation line forming a closed loop. The air prevailing at ambient pressure and temperature is compressed in the compressor. The air leaves the intake manifold through the air recirculation line and is decompressed to ambient pressure and returned to the suction side of the compressor, which is driven electrically, hydraulically or pneumatically during the starting phase.

Via a throttle in the air recirculation line the pressure of the air from the intake manifold is relieved to ambient pressure level. The throttle will not be required if the diameter and surface roughness of the air recirculation line are chosen in such a way that the same throttle effect will be obtained.

Thermodynamically, the heating of the air is effected in two steps. In the first step the compressor transforms electrical energy into compression energy. In the second step the compression energy is transformed in the throttle into increased flow velocity and, partially, into frictional heat. The compression/decompression cycle may be repeated as often as desired. Besides, the air recirculation process will ensure that hot air will reach all parts of the intake manifold.

If an intercooler is provided in the charge air line, the invention provides in a further step that the intercooler be bypassed via a bypass line. This will prevent the charge air and thus the intake manifold from cooling off.

To prevent the admission of cold air into the cylinders it is of advantage if the intake valves of the internal combustion engine are kept closed during starting. Closing of the intake valves in the start-up phase may be effected by a variable valve actuation device. If a variable valve actuation device is not possible the time for heating the combustion air will be prolonged.

During starting of the compressor a vacuum is generated in front of it. For compensation of this vacuum it is provided that the recirculation system be subject to ambient pressure at the suction side of the compressor, at least at the beginning of the starting phase. Due to the air entering the recirculation system the vacuum in front of the compressor can be compensated.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
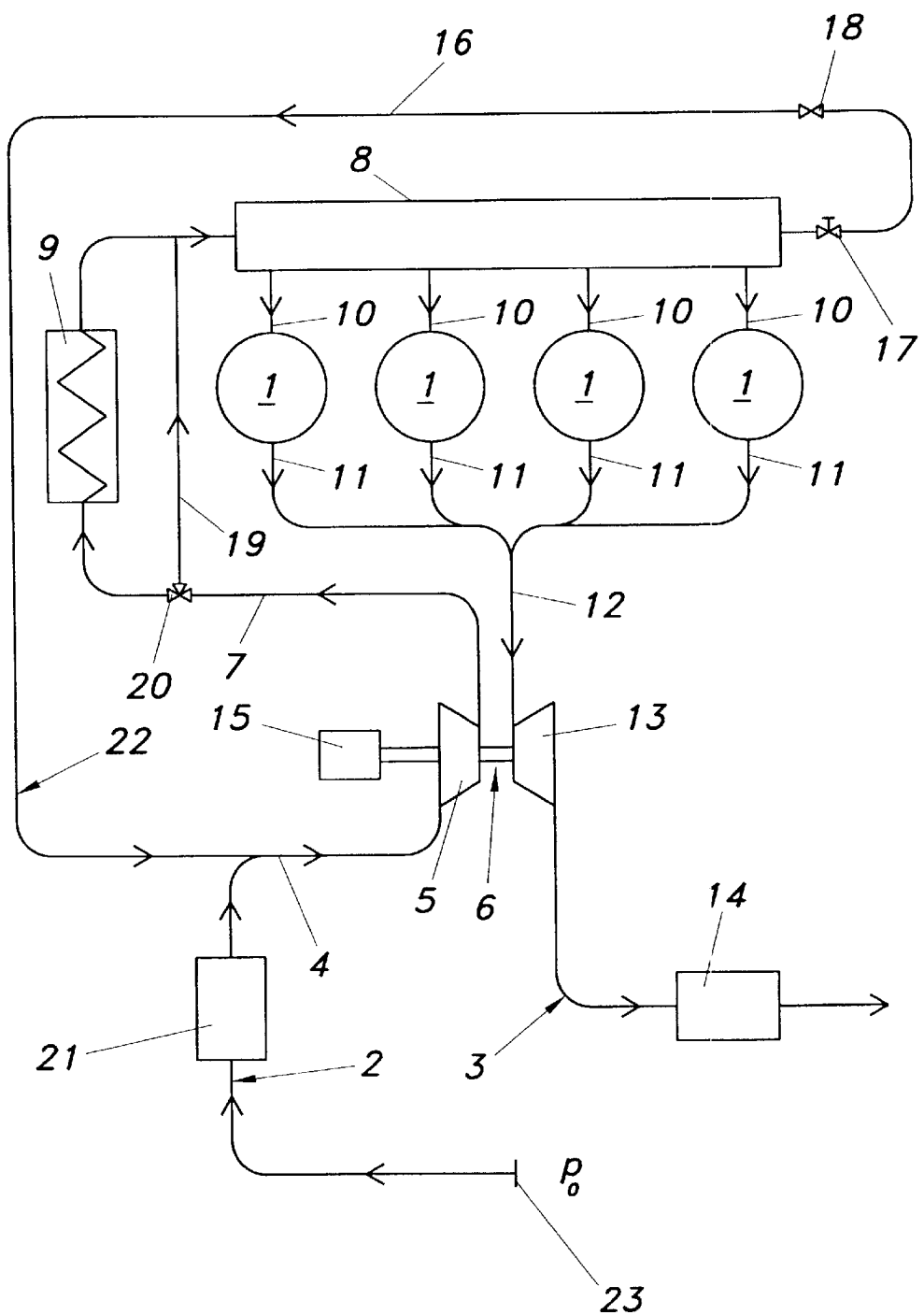
FIGS. 1 and 2 show different variants of the invention. Parts of identical function bear the same reference numerals.

FIG. 1 is a schematical representation of an internal combustion engine with several cylinders 1 and an intake system 2 and an exhaust system 3. In the intake flow passage 4 of the intake system 2 the compressor 5 of a turbocharger 6 is positioned. The charge air line 7 of the intake system 2 opens into an intake manifold 8, and an intercooler 9 may be positioned in the charge air line 7. The intake manifold 8 is connected to the cylinders 1 via intake ports 10. Exhaust flow passages 11 departing from the cylinders 1 lead via an exhaust pipe 12 to the exhaust gas turbine 13 of the turbocharger 6 and via the catalytic converter 14 and mufflers not shown here into the open.

The compressor 5 may be driven during starting independently of the engine by an electric motor 15 in order to preheat the air turboelectrically. The independent motor could also be constituted by hydraulic or pneumatic means.

From the intake manifold 8 an air recirculation line 16 branches off, which opens into the intake flow passage 4 upstream of the compressor 5. A switch valve 17 and a throttle 18 are positioned in the air recirculation line 16. The intercooler 9 may be bypassed via a bypass line 19.

During starting the flow is directed into the bypass line 19 by a switching of valve 20. In addition, the valve 17 in the air recirculation line 16 is opened. The air prevailing at ambient pressure $p_0$ and ambient temperature is taken in via the air filter 21 and compressed by means of the compressor 5. Through the bypass line 19 the air flows into the intake manifold 8 without going through the intercooler 9. To prevent the arrival of relatively cold air at the cylinders 1, the intake valves of the cylinders 1, which are not shown in this drawing, are held closed by a variable valve actuation device. If this is not possible, the time for preheating the combustion air will be prolonged. The air leaves the intake manifold 8 via the air recirculation line 16, in which is located the throttle 18. In throttle 18 the air is decompressed to the level of ambient pressure and is returned into the intake flow passage 4 leading to the compressor 5. In this way an essentially closed loop 22 will be established.

From the point of view of thermodynamics, the air is heated in two steps. In the first step the compressor 5 transforms drive energy into compression energy. In the second step the compression energy is transformed in the throttle 18 into increased flow velocity and partly into frictional heat. The compression/decompression cycle may be repeated as often as desired. Besides, the air circulation will ensure that hot air will reach all regions of the intake manifold 8.

During the starting phase of the compressor 5 a vacuum will develop on its suction side. To compensate this vacuum, the suction side of the compressor 5 is subject to ambient pressure $p_0$ via the inlet fitting 23 and the air filter 21, so that air is allowed to enter the loop 22.

As already mentioned, the throttle 18 is used to relieve the air pressure until the ambient pressure $p_0$ is reached. The throttle 18 need not be included if the air recirculation line 16 is provided with a suitable diameter and surface roughness such that the same throttle effect will result.

The preheating process will come to its end once the desired preheating temperature has been reached in the intake manifold 8 and the entire preheating loop. The air recirculation line 16 is shut by means of valve 17, and the intake valves are opened according to the firing sequence in the cylinders, and the engine is started by means of a starter motor not shown here.

Figure 2:
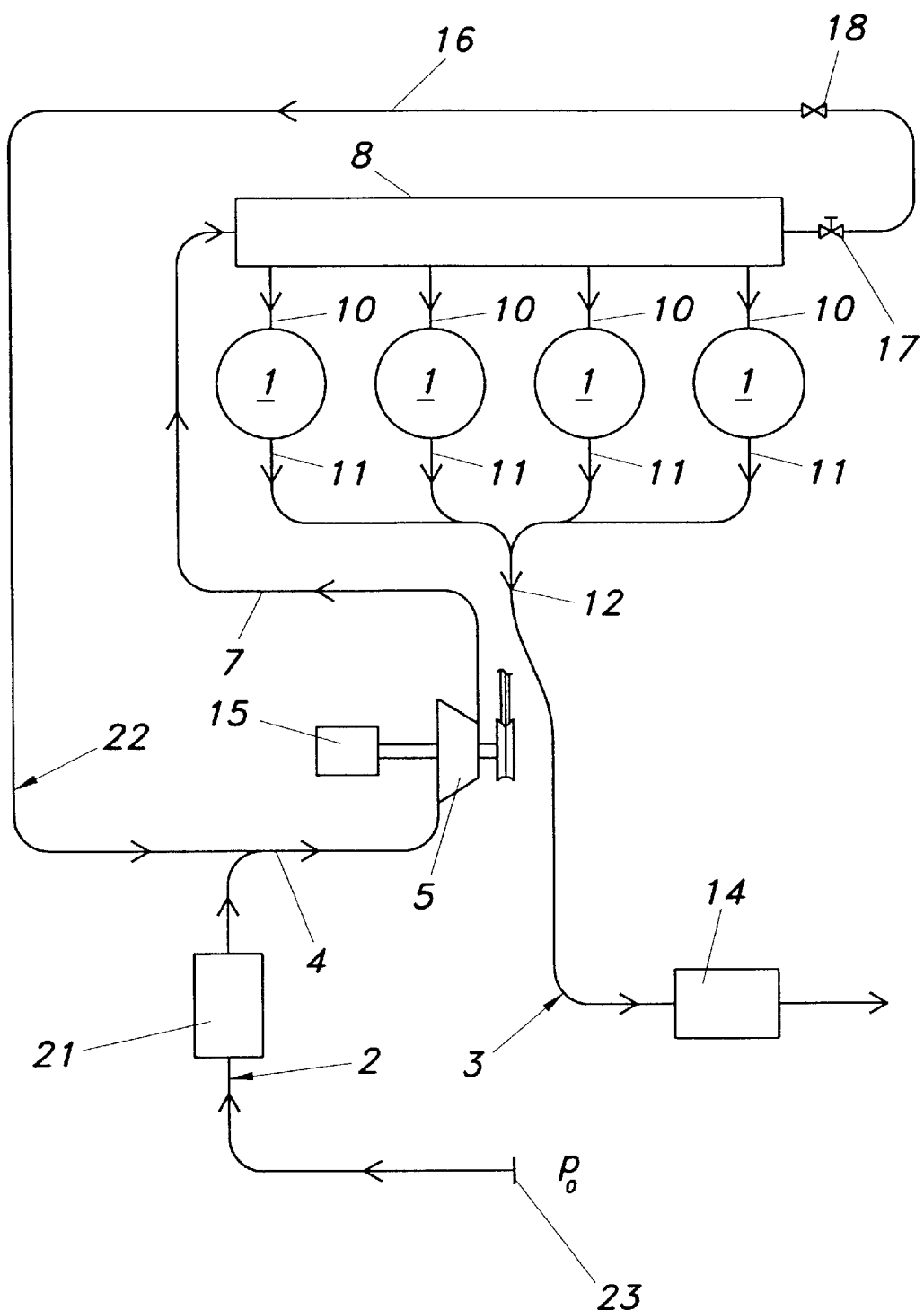

The variant shown in FIG. 2 differs from that in FIG. 1 in that the compressor 5 is not driven via an exhaust gas turbine but mechanically from the engine. During starting the compressor 5 is driven by electrical, hydraulical or pneumatical means, independently of the engine., as in the variant of FIG. 1. In order to permit a drive mechanism independent of the engine, the compressor 5 is non-rigidly connected to the crankshaft or a shaft driven from the latter, for example, by a freewheel mechanism. The starting process is the same as described for the first variant. Both variants may include or exclude an intercooler 9.

Since the heating of the air in the intake manifold 8 is not based on convection no heat exchange surfaces will be required which would hamper the flow in the pipes and would have to be heated beforehand.

The air preheating system described in this paper will allow internal combustion engines with a lower effective compression ratio to be started quickly without necessitating complex external preheating facilities. The low effective compression ratio to be achieved in this way will result in lower peak pressures and lower peak temperatures in the combustion chamber. This in turn will permit the use of a light-weight crankshaft und smaller crankshaft bearings, which will reduce engine friction, or, if dimensions remain unchanged, permit a higher power density. The air preheating system is suitable for naturally aspirated engines as well as for supercharged engines with or without intermediate cooling.

What is claimed is:

1. An internal combustion engine, a self-igniting type, with a compressor, which is located in an intake flow passage for compression of the intake air, and with a charge air line leading to an intake manifold, the compressor operating independently of the engine by means of an electric, hydraulic or pneumatic drive at least in the starting phase, wherein an air recirculation line controlled by a valve branches off from the intake manifold, which air recirculation line opens into the intake flow passage upstream of the compressor, charge air line and air recirculation line forming a closed loop, at least in the starting phase; and wherein a throttle is positioned in the air recirculation line.

2. The internal combustion engine according to claim 1, comprising an intercooler in the charge air line, wherein the intercooler can be bypassed via a bypass line.

3. A method of starting an internal combustion engine, a self-igniting type, wherein in a starting phase a flow connection between an intake manifold and a suction side of a compressor is established via an air recirculation line and the compressor is driven independently of the engine, by means of an electric, hydraulic or pneumatic drive, so that the air in a charge air line, the intake manifold, the air recirculation line and the compressor is delivered in a loop, whereby the charge air line and the intake manifold is scavenged, and wherein the air recirculation line is closed after the starting phase has come to an end and a throttle is positioned in the air recirculation line.

4. The method according to claim 3, wherein in the starting phase the intake valves of the internal combustion are kept shut.

5. The method according to claim 3, wherein in the starting phase the exhaust valves of the internal combustion are kept shut.

6. The method according to claim 3; wherein an intercooler is provided in the charge air line, wherein the intercooler is bypassed during starting via a bypass line.

7. The method according to claim 3, wherein at least at the beginning of the starting phase the loop is subject to ambient pressure at the suction side of the compressor.

* * * * *